(12) United States Patent
Gouerec et al.

(10) Patent No.: US 10,316,208 B2
(45) Date of Patent: Jun. 11, 2019

(54) PENCIL FOR WRITING OR COLOURING

(71) Applicant: CONTE, Boulogne-sur-Mer (FR)

(72) Inventors: Julien Gouerec, La Capelle-les-Boulogne (FR); Philippe Lefebvre, Wimereux (FR)

(73) Assignee: CONTE, Boulogne-sur-Mer (FR)

(*) Notice: Subject to any disclaimer, the term of this patent is extended or adjusted under 35 U.S.C. 154(b) by 163 days.

(21) Appl. No.: 15/537,032

(22) PCT Filed: Dec. 14, 2015

(86) PCT No.: PCT/FR2015/053468
§ 371 (c)(1),
(2) Date: Jun. 16, 2017

(87) PCT Pub. No.: WO2016/097554
PCT Pub. Date: Jun. 23, 2016

(65) Prior Publication Data
US 2017/0348997 A1    Dec. 7, 2017

(30) Foreign Application Priority Data

Dec. 17, 2014    (FR) ..................... 14 62664

(51) Int. Cl.
*B43K 19/02*    (2006.01)
*C09D 13/00*    (2006.01)
(Continued)

(52) U.S. Cl.
CPC .............. *C09D 13/00* (2013.01); *B43K 19/02* (2013.01); *B43K 19/16* (2013.01); *B43K 19/18* (2013.01)

(58) Field of Classification Search
CPC ........ B43K 19/02; B43K 19/16; B43K 19/18; C09D 13/00
See application file for complete search history.

(56) References Cited

U.S. PATENT DOCUMENTS 5,244,297 A * 9/1993 Bachelet ................ B43K 19/16
401/96
6,572,295 B1 * 6/2003 Chochoy ................ B43K 19/16
156/244.12
(Continued)

FOREIGN PATENT DOCUMENTS

DE    202006015052 U1    3/2008
DE    202008009751 U1    10/2009
(Continued)

OTHER PUBLICATIONS

International Search Report dated Apr. 20, 2016 from corresponding International PCT Application PCT/FR2015/053468, 2 pages.

*Primary Examiner* — Nicholas J. Weiss
(74) *Attorney, Agent, or Firm* — Ohlandt, Greeley, Ruggiero & Perle, L.L.P.

(57) ABSTRACT

The present invention thus relates to a writing or color pencil comprising the following 3 layers obtained by coextrusion a polyolefin-based non-expanded lead, a non-expanded protective intermediate layer surrounding the lead and comprising a mixture of polystyrene and EVA, and an expanded synthetic wood material based on a styrene polymer surrounding the protective intermediate layer, the protective intermediate layer thickness/lead radius ratio being between 0.05 and 0.17, advantageously between 0.07 and 0.15.

20 Claims, 1 Drawing Sheet

(51) Int. Cl.
*B43K 19/16* (2006.01)
*B43K 19/18* (2006.01)

(56) References Cited

U.S. PATENT DOCUMENTS

| | | | |
|---|---|---|---|
| 8,747,003 B2* | 6/2014 | Thies | A45D 40/20 144/28 |
| 8,845,220 B2* | 9/2014 | Thies | B29C 47/0016 401/49 |
| 8,998,519 B2* | 4/2015 | Patel | B43K 19/00 264/172.15 |
| 2006/0194049 A1* | 8/2006 | Thies | B43K 19/02 428/375 |
| 2011/0129284 A1 | 6/2011 | Thies et al. | |

FOREIGN PATENT DOCUMENTS

| | | |
|---|---|---|
| EP | 2644407 A1 | 10/2013 |
| WO | 01/43987 A1 | 6/2001 |
| WO | 2010/006744 A1 | 1/2010 |

* cited by examiner

PENCIL FOR WRITING OR COLOURING

The present invention relates to writing or color pencils obtained by coextrusion, comprising a polymer-based lead and a synthetic wood material.

Such writing or color pencils are known to those skilled in the art.

In particular, patent application WO 01/43987 indicates that these pencils must comprise an intermediate protective layer whose thermoplastic material must have a solidification point below the solidification point of the thermoplastic material of the lead so as to avoid problems of cracking of the lead during its cooling.

However, in the examples of said patent application, the lead and the synthetic wood material are made from an identical thermoplastic material (polystyrene methacrylate copolymer) and the thickness recommended for this protective layer is 0.3 mm for a lead 2 mm in diameter, i.e. an intermediate protective layer thickness/lead radius ratio of 0.3. Said patent application even specifies that the thickness of this protective layer should be at least 0.5 mm for soft leads.

Now, the inventors have realized, surprisingly, that when the thermoplastic material of the lead is a polyolefin rather than a polystyrene methacrylate copolymer as in said example, a problem of decohesion appears between the lead and the protective layer during the sharpening operation, which is undesirable.

None of the prior disclosures known to date describes such a problem.

Thus, patent application WO 2010/006744 also describes the mandatory presence of an adhesion layer between the lead and the synthetic wood material for pencils whose lead polymer is incompatible with the polymer of the synthetic wood material. However, it is not indicated anywhere what the thickness of this layer should be and the problems of decohesion between this adhesion layer and the lead are not mentioned.

Patent application US 2006/0194049 also describes the presence of a lead-protecting envelope which has greater flexural strength than that of the lead and which thus stabilizes the lead to prevent it from breaking. It recommends that the volume of the envelope be smaller than or equal to the volume of the lead. In the examples, the lead area/envelope area ratio for a paper pencil is 1 and for a color pencil is 1.44, which corresponds to an intermediate layer thickness/lead radius ratio, respectively, of 0.4 and 0.3.

This therefore does not solve the problem of decohesion between the lead and the protective layer during the sharpening operation.

Now, the inventors have discovered that, to solve the problems of decohesion during the pencil sharpening operation, while at the same time maintaining a protective layer that can fulfill the functions of adhesion layer between the polyolefin-based lead and the synthetic wood material based on a styrene polymer and while making it possible to avoid cracking of the lead, it was necessary to use a non-expanded protective layer comprising a mixture of polystyrene and EVA and having a protective intermediate layer thickness/lead radius ratio of between 0.05 and 0.17. Finally, by means of such a ratio, this layer may be made visible to the consumer by using a different color from that of the lead and of the synthetic wood material.

The present invention thus relates to a writing or color pencil comprising the following 3 layers obtained by coextrusion:

a polyolefin-based non-expanded lead,
a non-expanded protective intermediate layer surrounding the lead and comprising a mixture of polystyrene and EVA, and
an expanded synthetic wood material based on a styrene polymer surrounding the protective intermediate layer,
the protective intermediate layer thickness/lead radius ratio being between 0.05 and 0.17, advantageously between 0.07 and 0.15.

The pencil according to the present invention thus comprises a polyolefin-based lead.

For the purposes of the present invention, the term "polyolefin-based lead" means any writing or color pencil lead comprising at least one polyolefin. Advantageously, the polyolefin is the main polymer of the lead. Even more advantageously, the lead does not comprise any other polymers. Advantageously, the polyolefin may be polyethylene or polypropylene; in particular, it is polypropylene, more particularly polypropylene homopolymer.

Advantageously, the polyolefin content of the lead is between 15 and 45% by weight relative to the total weight of the lead composition, advantageously between 20 and 40% by weight relative to the total weight of the lead composition.

The lead according to the present invention may be a paper pencil lead or a color pencil lead.

In the case where the lead according to the present invention is a paper pencil lead, it may comprise a polyolefin content of between 15 and 40% by weight, advantageously between 20 and 35% by weight, relative to the total weight of the lead composition.

In the case where the lead according to the present invention is a color pencil lead, it may comprise a polyolefin content of between 25 and 45% by weight, advantageously between 30 and 40% by weight, relative to the total weight of the lead composition.

The lead according to the present invention may also comprise mineral fillers, pigments and/or additives. Advantageously, the lead does not comprise any plasticizer.

Advantageously the pigment content of the lead is between 5 and 20% by weight, the mineral filler content is between 25 and 75% by weight and/or the additive content is between 0 and 40% by weight, relative to the total weight of the lead composition.

In the case where the lead according to the present invention is a paper pencil lead, it may comprise graphite and optionally a colorless mineral filler. In particular, it comprises graphite and a colorless mineral filler. Advantageously, the colorless mineral filler is chosen from a clay, talc, boron nitride, silica, calcium carbonate, mica, steatite powder, and mixtures thereof. In a particularly advantageous manner, it is a lamellar filler, chosen more particularly from a clay, boron nitride, mica and/or talc, for example a clay, chosen in particular from montmorillonite, bentonite and kaolin. Advantageously, it is kaolin.

Advantageously, the graphite content of the paper pencil lead according to the present invention is between 40 and 60%, in particular between 44 and 50%, by weight relative to the total weight of the lead composition. Advantageously, the colorless mineral filler content of the paper pencil lead according to the present invention is between 5 and 15%, in particular between 6 and 10% by weight relative to the total weight of the lead composition.

It may also comprise carbon black as pigment.

Advantageously, the carbon black content of the paper pencil lead according to the present invention is between 5 and 20%, in particular between 5 and 15% by weight relative to the total weight of the lead composition.

In the case where the lead according to the present invention is a color pencil lead, the mineral filler is a colorless mineral filler, in particular as described above.

Advantageously, the colorless mineral filler content of the color pencil lead according to the present invention is between 25 and 50%, in particular between 30 and 40% by weight relative to the total weight of the lead composition.

The additives that may be used in the lead according to the present invention may be chosen from glidants, processing agents, coupling agents, dispersants, lubricants and the other additives that are well known to those skilled in the art. For example, it may be stearate (zinc, calcium, magnesium or sodium stearate and mixtures thereof), waxes, paraffins, fatty acids, amides such as a stearamide, in particular ethylenebisstearamide, glycerol and derivatives thereof such as glycerol dibehenate, glycerol behenate, glycerol stearate and/or polyglycerol diisostearate, siloxane grafted onto polypropylene, and mixtures thereof, and in particular it is calcium stearate, magnesium stearate, zinc stearate, amides, or a mixture thereof.

The lead according to the present invention is non-expanded. Thus, no expansion agent is used during its manufacturing process. In addition, the polyolefin used is not expanded.

In a particular embodiment of the present invention, the lead has a diameter of between 2 and 3.6 mm.

In particular, in the case of fine leads, the lead has a diameter of between 2 and 2.3 mm. In this case, advantageously, the protective intermediate layer thickness/lead radius ratio is between 0.05 and 0.16, advantageously between 0.06 and 0.15, more advantageously between 0.07 and 0.15.

In the case of thick leads, the lead has a diameter of between 3 and 3.6 mm. In this case, advantageously, the protective intermediate layer thickness/lead radius ratio is between 0.07 and 0.16, advantageously between 0.08 and 0.15, more advantageously between 0.09 and 0.15. The lead according to the present invention must thus comprise fillers and pigments for writing that are readily transferable onto the writing or coloring support so as to have good covering power.

The pencil according to the present invention comprises a non-expanded protective intermediate layer surrounding, advantageously concentrically, the lead and comprising a mixture of polystyrene and EVA. This intermediate layer has a double role:

First, it ensures the adhesion between the polyolefin-based lead and the synthetic wood material based on a styrene polymer.

It also makes it possible to compensate for the shrinkage of the lead during the cooling step after the coextrusion step, which avoids the problems of cracking of the lead.

This protective intermediate layer thus totally separates the lead from the synthetic wood material.

In an advantageous embodiment, the protective intermediate layer has a thickness of between 0.05 and 0.31 mm, more advantageously between 0.07 and 0.27 mm, in particular between 0.08 and 0.17 mm.

In particular, in the case of fine leads, the protective intermediate layer advantageously has a thickness of between 0.05 and 0.18 mm, advantageously between 0.07 and 0.17 mm, in particular between 0.08 and 0.17 mm.

In the case of thick leads, the protective intermediate layer advantageously has a thickness of between 0.13 and 0.31 mm, more advantageously between 0.15 and 0.28 mm, in particular between 0.16 and 0.27 mm.

The protective intermediate layer according to the present invention comprises a mixture of polystyrene and EVA (ethyl vinyl acetate) and it is advantageously formed by a mixture of polystyrene and EVA. Advantageously, the polystyrene is an atactic polystyrene.

In the context of the present invention, the purpose of the polystyrene is to allow adhesion between the protective intermediate layer and the synthetic wood material and also to allow good mechanical strength of this layer.

Advantageously, the EVA comprises between 10 and 40% by weight of vinyl acetate, in particular between 20 and 30% by weight, relative to the total weight of the EVA. In the context of the present invention, the EVA has the role of allowing adhesion between the protective intermediate layer and the lead and of reducing the solidification point (commonly referred to as the softening point) of the polystyrene so that the solidification point of the polystyrene-EVA mixture is less than the solidification point of the polyolefin of the lead.

In an advantageous embodiment, the content of the mixture of polystyrene and EVA of the protective intermediate layer is between 85 and 100% by weight relative to the total weight of the protective intermediate layer (100% corresponds to a protective intermediate layer formed by a mixture of polystyrene and EVA), advantageously between 90 and 97% by weight relative to the total weight of the protective intermediate layer, more advantageously between 93 and 96% by weight relative to the total weight of the protective intermediate layer.

The protective intermediate layer may also comprise pigments, such as a masterbatch, which in particular serve to give this layer color.

Advantageously, the pigment content of this layer is between 3 and 10% by weight relative to the total weight of the protective intermediate layer, more advantageously between 4 and 7% by weight relative to the total weight of the protective intermediate layer.

In a particular embodiment, the protective intermediate layer has a different color from the lead and from the synthetic wood material.

This thus allows this layer to be visible to the consumer, which may be of aesthetic interest and makes it possible to modify the various colors to make the pencil very distinctive and attractive.

In another advantageous embodiment, this layer has the same color as that of the lead, which makes it possible to give the consumer the impression that the pencil has a thicker lead.

Advantageously, the polystyrene content of the protective intermediate layer is between 40 and 90% by weight, more advantageously between 40 and 75% by weight, even more advantageously between 45 and 70% by weight relative to the total weight of the protective intermediate layer. Advantageously, the EVA content of the protective intermediate layer is between 10 and 60% by weight, advantageously between 20 and 55% by weight, even more advantageously between 25 and 50% by weight relative to the total weight of the protective intermediate layer.

Moreover, the protective intermediate layer is non-expanded. Thus, no expansion agent is used during its manufacturing process. In addition, the polystyrene used is not expanded.

Furthermore, advantageously, the protective intermediate layer does not have a flexural strength higher than that of the lead.

In addition, advantageously, the protective intermediate layer does not have the same function as the lead, i.e. it is not intended for writing or for coloring. The pigments that may be present in this layer are therefore not readily transferable onto the writing support and thus do not have good covering power.

On the other hand, it advantageously has a melting point less than or equal to both that of the lead and that of the synthetic wood material.

The pencil according to the present invention also comprises an expanded synthetic wood material based on styrene polymer and surrounding, advantageously concentrically, the protective intermediate layer.

For the purposes of the present invention, the term "synthetic wood material" means any synthetic material of a polymer-based writing or color pencil whose density and sharpenability are similar to those of wood.

For the purposes of the present invention, the term "synthetic wood material based on styrene polymer" means any synthetic wood material as defined above comprising at least one styrene polymer, i.e. a sytrene-based polymer or copolymer. Advantageously, the styrene polymer is the main polymer of the synthetic wood material. Even more advantageously, the synthetic wood material does not comprise any other polymers. Advantageously, the styrene polymer may be polystyrene, ABS (acrylonitrile-butadiene-styrene) or a polystyrene methacrylate copolymer; in particular, it is polystyrene, more particularly atactic polystyrene.

Advantageously, the content of styrene polymer, in particular of polystyrene, of the synthetic wood material is between 60 and 100% by weight, advantageously between 70 and 98% by weight, in particular between 80 and 95% by weight, relative to the total weight of the synthetic wood material.

The synthetic wood material may contain, besides the styrene polymer, pigments (a few percent by weight, in particular between 0 and 5% by weight, advantageously between 0.5 and 2% by weight, relative to the total weight of the composition of the synthetic wood material), such as a masterbatch and/or red iron oxide, in particular to give a color similar to wood to the synthetic wood material, plasticizers, sawdust, mineral fillers (a few percent by weight, advantageously between 0 and 10% by weight, in particular between 2 and 6% by weight, more particularly between 3 and 5% by weight, relative to the total weight of the composition of the synthetic wood material), which are in particular colorless, such as clays, for example kaolin, and/or other additives such as calcium stearate and/or a stearamide (a few percent by weight, advantageously between 0 and 5% by weight, in particular between 1 and 3% by weight, relative to the total weight of the composition of the synthetic wood material).

The synthetic wood material is expanded so as to obtain a density close to that of wood. To obtain an expanded synthetic wood material, an expander, for instance azodicarbonamide, was advantageously added to the composition of the synthetic wood material before extrusion.

Since the three layers may be obtained by coextrusion, the pencil according to the present invention may be manufactured via a continuous process. In particular, this process is as described in application WO 01/43987.

The pencil assembly according to the present invention must have good sharpenability and a density close to that of a conventional wood pencil.

In a particular embodiment of the present invention, the writing or color pencil according to the invention comprises an additional decorative layer, advantageously of varnish, surrounding, in particular concentrically, the synthetic wood material. Advantageously, the decorative layer is made from a material that is compatible with that of the synthetic wood material.

Advantageously, the writing or color pencil according to the present invention may have a hexagonal, round or triangular cross section, advantageously round or hexagonal, cross section.

Advantageously, it may comprise a means for erasing, such as a rubber, at the non-sharpened end of the pencil.

The invention will be understood more clearly on reading the description of the figures and of the examples that follow.

Figure 1:
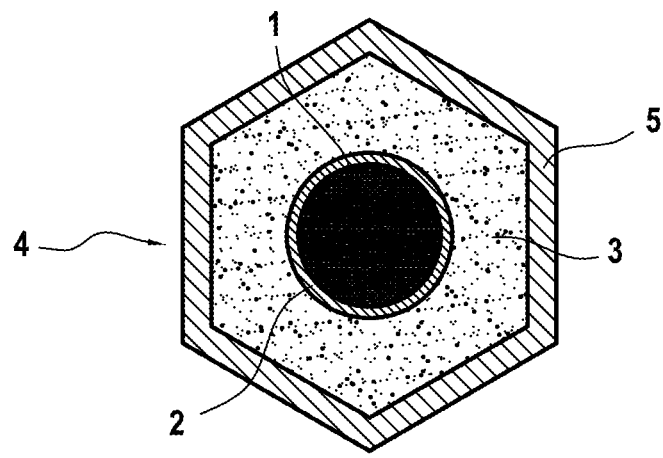
FIG. 1 represents a cross section of an example of a paper pencil of hexagonal cross section according to the invention.
Figure 2:
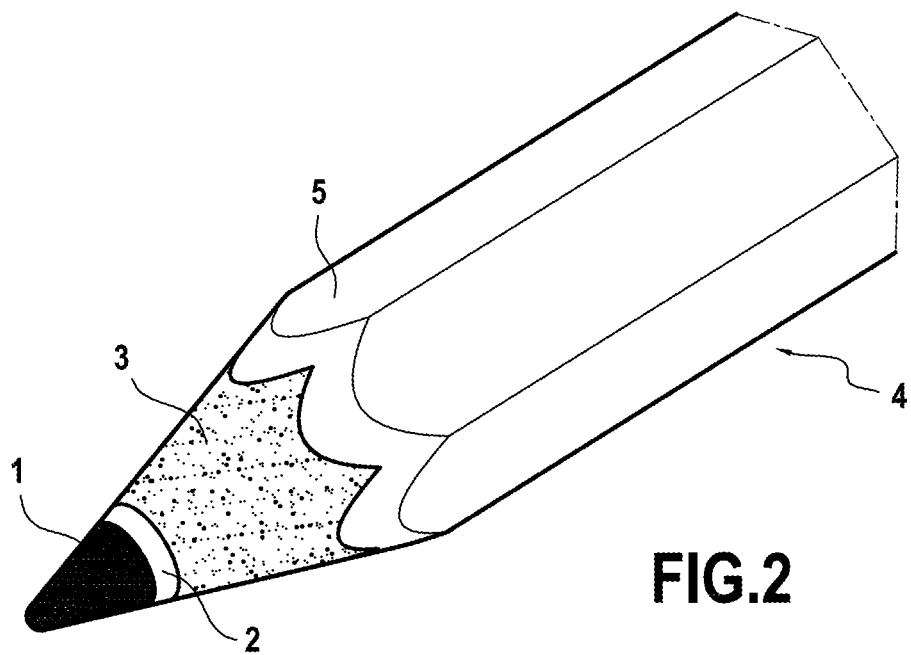
FIG. 2 represents a view in perspective of the paper pencil example with a hexagonal cross section according to the invention.

The paper pencil example with a hexagonal cross section 4 according to the invention represented in FIGS. 1 and 2 thus comprises four layers, the lead (1) of circular cross section, the protective intermediate layer (2) of circular cross section which concentrically surrounds the lead (1), the expanded synthetic wood material (3) of hexagonal cross section which concentrically surrounds the protective intermediate layer, and a decorative layer (5) of hexagonal cross section which concentrically surrounds the synthetic wood material. The protective intermediate layer 2 has a different color from the lead and from the synthetic wood material and is thus visible both on the cross section of the pencil (FIG. 1), but also on the sharpened part of the pencil (FIG. 2).

EXAMPLE 1

A paper pencil of hexagonal cross section as illustrated in FIGS. 1 and 2 or of triangular cross section according to the invention was manufactured by coextrusion. The compositions of the various layers are as follows:

lead: polypropylene (PP, 25-35%), graphite (40-50%)+additives/pigments protective intermediate layer: polystyrene (40-50%), EVA (45-55%)+pigments synthetic wood material (3): polystyrene (90-95%)+additives/pigments/colorless mineral filler.

Various thicknesses of the protective intermediate layer and various diameters of the lead were tested. A visual control is performed after the step of sharpening the pencil. When the protective intermediate layer has a tendency to become detached from the lead during the sharpening, the product is considered as "unacceptable".

Paper pencil of hexagonal cross section with a lead diameter of 2.30 mm

| Thickness of the protective intermediate layer (mm) | Protective intermediate layer thickness/lead radius ratio | Result |
| --- | --- | --- |
| 0.08 | 0.07 | Acceptable |
| 0.15 | 0.13 | Acceptable |
| 0.17 | 0.15 | Acceptable |
| 0.22 | 0.19 | Unacceptable |

| Paper pencil of triangular cross section with a lead diameter of 3.55 mm | | |
| --- | --- | --- |
| Thickness of the protective intermediate layer (mm) | Protective intermediate layer thickness/lead radius ratio | Result |
| 0.16 | 0.09 | Acceptable |
| 0.27 | 0.15 | Acceptable |
| 0.39 | 0.22 | Unacceptable |

The invention claimed is:

1. A writing or color pencil comprising the following 3 layers obtained by coextrusion:
   a polyolefin-based non-expanded lead,
   a non-expanded protective intermediate layer surrounding the lead and comprising a mixture of polystyrene and ethyl vinyl acetate (EVA), and
   an expanded synthetic wood material based on a styrene polymer surrounding the protective intermediate layer,
   the protective intermediate layer thickness/lead radius ratio being between 0.05 and 0.17.

2. The writing or color pencil as claimed in claim 1, wherein the polyolefin of the lead is polypropylene.

3. The writing or color pencil as claimed in claim 1, wherein the protective intermediate layer has a thickness of between 0.05 and 0.31 mm.

4. The writing or color pencil as claimed in claim 1, wherein the lead has a diameter of between 2 and 3.6 mm.

5. The writing or color pencil as claimed in claim 1, wherein the protective intermediate layer has a different color from the lead and from the synthetic wood material.

6. The writing or color pencil as claimed in claim 1, wherein the content of the mixture of polystyrene and EVA of the protective intermediate layer is between 85 and 100%, by weight relative to the total weight of the protective intermediate layer.

7. The writing or color pencil as claimed in claim 1, wherein the polystyrene content of the protective intermediate layer is between 40 and 90% by weight, relative to the total weight of the protective intermediate layer.

8. The writing or color pencil as claimed in claim 1, wherein the EVA content of the protective intermediate layer is between 10 and 60% by weight, relative to the total weight of the protective intermediate layer.

9. The writing or color pencil as claimed in claim 1, wherein the styrene polymer content of the synthetic wood material is between 60 and 100% by weight, relative to the total weight of the synthetic wood material.

10. The writing or color pencil as claimed in claim 1, wherein the styrene polymer of the synthetic wood material is polystyrene.

11. The writing or color pencil as claimed in claim 1, wherein the lead does not comprise any plasticizer.

12. The writing or color pencil as claimed in claim 1, which is a paper pencil and wherein the lead comprises graphite.

13. The writing or color pencil as claimed in claim 1, which is a colored pencil.

14. The writing or color pencil as claimed in claim 1, which comprises an additional decorative layer, surrounding, the synthetic wood material.

15. The writing or color pencil as claimed in claim 1, wherein the protective intermediate layer thickness/lead radius ratio is between 0.07 and 0.15.

16. The writing or color pencil as claimed in claim 3, wherein the protective intermediate layer has a thickness of between 0.07 and 0.27 mm.

17. The writing or color pencil as claimed in claim 16, wherein the protective intermediate layer has a thickness of between 0.08 and 0.17 mm.

18. The writing or color pencil as claimed in claim 4, wherein the lead has a diameter of between 2 and 2.3 mm.

19. The writing or color pencil as claimed in claim 6, wherein the content of the mixture of polystyrene and EVA of the protective intermediate layer is between 90 and 97% by weight relative to the total weight of the protective intermediate layer.

20. The writing or color pencil as claimed in claim 7, wherein the polystyrene content of the protective intermediate layer is between 40 and 75% by weight, relative to the total weight of the protective intermediate layer.

\* \* \* \* \*